US012715396B2

(12) United States Patent
Schaeuble et al.

(10) Patent No.: US 12,715,396 B2
(45) Date of Patent: Aug. 25, 2026

(54) DEVICE FOR MINIMIZING SOILING OF A VEHICLE ENVIRONMENTAL SENSOR

(71) Applicant: Robert Bosch GmbH, Stuttgart (DE)

(72) Inventors: Michael Schaeuble, Vaihingen An der Enz (DE); Alan Pfetzer, Buehl (DE); Alexander Dudek, Offenburg (DE); Anisha Saxena, Hirschberg (DE); Daniel Weiler, Ottersweier (DE); Hubert Lamm, Kappelrodeck (DE); Johann Klaehn, Mannheim (DE); Jonas Frick, Mutterstadt (DE); Marcel Knick, Steinheim (DE); Oliver Enzmann, Gaggenau (DE); Stephan Lenor, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 18/619,352

(22) Filed: Mar. 28, 2024

(65) Prior Publication Data

US 2024/0326754 A1 Oct. 3, 2024

(30) Foreign Application Priority Data

Mar. 31, 2023 (DE) ........................ 102023202976.6

(51) Int. Cl.
*B60S 1/56* (2006.01)
*B60W 10/30* (2006.01)
*B60W 30/16* (2020.01)

(52) U.S. Cl.
CPC ............... *B60S 1/56* (2013.01); *B60W 10/30* (2013.01); *B60W 30/16* (2013.01); *B60W 2552/05* (2020.02); *B60W 2554/4041* (2020.02); *B60W 2554/406* (2020.02); *B60W 2554/802* (2020.02); *B60W 2554/804* (2020.02); *B60W 2555/20* (2020.02); *B60W 2720/10* (2013.01); *B60W 2720/106* (2013.01); *B60W 2754/30* (2020.02)

(58) Field of Classification Search
CPC ......... B60W 60/0027; B60W 2555/20; B60W 2556/45; B60S 1/56; B60S 1/603; G01S 7/4043; G01S 2013/9323; G01S 2013/9324; G01S 2013/9322
See application file for complete search history.

(56) References Cited

U.S. PATENT DOCUMENTS

| | | | | |
|---|---|---|---|---|
| 11,241,721 | B2 | 2/2022 | Violetta | |
| 2019/0152447 | A1 | 5/2019 | Hansen et al. | |
| 2019/0161090 | A1 * | 5/2019 | Miura | B60W 30/16 |
| 2021/0107040 | A1 * | 4/2021 | Violetta | B08B 3/041 |
| 2024/0034278 | A1 * | 2/2024 | Herse | B60S 1/487 |

* cited by examiner

*Primary Examiner* — Toya Pettiegrew
(74) *Attorney, Agent, or Firm* — Michael Best & Friedrich LLP

(57) ABSTRACT

A device for minimizing soiling of an environmental sensor of a vehicle having an evaluation unit, wherein the evaluation unit is configured to determine information about objects in the environment of the vehicle which are potentially set up to cause soiling of the environmental sensor in a region of a field of view of the environmental sensor, to determine minimum distances between the respective objects on the basis of the determined information, compliance with which is suitable for minimizing soiling of the environmental sensor, and to generate and provide a signal representing the determined minimum distances.

11 Claims, 2 Drawing Sheets

20
50
70
95
90
30
150
10
60
80
140
100
110
40,65

120
40
120
40
120
40
130
132
134
20

DEVICE FOR MINIMIZING SOILING OF A VEHICLE ENVIRONMENTAL SENSOR

BACKGROUND

The present invention relates to a device for minimizing soiling of an environmental sensor of a vehicle.

Vehicles with one or more sensors for detecting the vehicle's environment are known from the prior art. Based on such sensors, driver assistance systems and/or systems for (partially) autonomous driving can be implemented in vehicles, for example, in order to increase driving safety and/or comfort.

Since such sensors, which are directed into the environment, are exposed to potential soiling that can impair the reception performance of the sensors, cleaning devices for the sensors are used in the prior art, which comprise, for example, a wiping element and/or a cleaning nozzle.

SUMMARY

The present invention proposes a device for minimizing soiling of an environmental sensor of a vehicle. The environmental sensor is designed, for example, as a camera and/or as a lidar sensor and/or as a radar sensor and/or as an ultrasonic sensor and/or as a sensor other than these. The arrangement and/or orientation of the environmental sensor on and/or inside the vehicle is generally not restricted. Exemplary arrangement positions are in regions of a front and/or rear bumper and/or in an interior of the vehicle, e.g., behind a window, in particular a windshield of the vehicle, in a roof region of the vehicle, etc.

The vehicle is, for example, a road vehicle (e.g., motorcycle, car, van, truck) or a rail vehicle or an aircraft/airplane and/or a watercraft. It is particularly preferable for the vehicle to have at least one driver assistance system and/or a system for (partially) autonomous driving, which works on the basis of environment detection by the environmental sensor.

The device according to the invention is, for example, a component of an existing control unit of the vehicle, an independent component of the vehicle or a device distributed over several components of the vehicle. The device has an evaluation unit which is designed, for example, as an ASIC, FPGA, processor, digital signal processor, microcontroller or similar.

The evaluation unit is set up to determine information about objects in the environment of the vehicle that are potentially set up to cause soiling of the environmental sensor in a region of a field of view of the environmental sensor. It should be noted that "soiling" should generally be understood to mean all deposits and/or adhesions on the environmental sensor which are set up to influence signals (e.g., sound waves, electromagnetic waves, etc.) emitted and/or received by the environmental sensor (e.g., by attenuation and/or scattering and/or diffraction and/or deflection). This comprises, for example, dirt particles and/or water droplets and/or adhering insects, etc.

Objects that can cause soiling of the environmental sensor are, for example, other road users in the environment of the vehicle (e.g., cars, trucks, buses, two-wheelers, etc.), which can cause soiling of the vehicle's environmental sensor, particularly in conjunction with a wet and/or soiled roadway. In a broader sense, such objects can alternatively or additionally be understood as precipitation (e.g., rain, snow, etc.) in the environment of the vehicle or objects other than these.

The evaluation unit is also set up to determine minimum distances to the respective objects based on the information obtained, compliance with which is suitable for minimizing soiling of the environmental sensor.

It should be noted that the "minimization" of soiling can refer to both a reduced accumulation of soiling on the environmental sensor compared to a vehicle without the device according to the invention, as well as a complete avoidance of soiling of the environmental sensor.

For this purpose, the evaluation unit is set up, for example, to determine a soiling-causing zone around the respective object for each determined object, the extent and/or shape (e.g., rectangular) of which is preferably adapted depending on a respective type and/or characteristic of the objects and/or depending on currently existing boundary conditions. The minimum distances determined by the evaluation unit can then be advantageously determined by ensuring that the respective soiling-causing zones of the objects do not or only partially overlap a contour of the vehicle and/or the arrangement position of the environmental sensor.

Finally, the evaluation unit is set up to generate and provide a signal representing the determined minimum distances. Provision is made, for example, via an on-board network of the vehicle (e.g., via a bus system and/or a different communication connection of the vehicle) to another component of the vehicle. Alternatively or additionally, it is also possible for the signal to be provided to a software and/or hardware component of the evaluation unit within the evaluation unit.

Preferably, the signal is used in the vehicle to set the distances determined to the objects in the environment of the vehicle. It should be noted that the minimum distances determined by the evaluation unit can be ideal distances to be maintained, which were determined independently or at least partially independently of other boundary conditions, which therefore cannot be set directly to the full extent and thus maintained. This can be taken into account by the component intended for setting the distances by maintaining the minimum distances as far as possible.

Alternatively or additionally, it is also conceivable that the evaluation unit is set up to take current boundary conditions into account when determining the minimum distances, so that the minimum distances determined in this way can be set directly, unless the boundary conditions change between the determination of the minimum distances and the setting of the minimum distances. This can be checked and ensured accordingly using the evaluation unit and/or a component of the vehicle that sets the minimum distances.

The device according to the invention offers, among other things, the advantage that by determining suitable distances to potentially soiling-causing objects, soiling of the environmental sensor can be minimized, whereby safety and/or functionality of the vehicle can be maintained longer or permanently compared to a case in which a vehicle does not have the device according to the invention.

In a case in which, for example, a washing liquid-based cleaning device is provided for the environmental sensor, the device according to the invention can also reduce washing liquid consumption, since cleaning intervals for the environmental sensor can be increased by using the device.

In an advantageous configuration of the present invention, the evaluation unit is set up to determine the information about the objects in the environment of the vehicle on the basis of the environmental sensor itself and/or on the basis of a further sensor of the vehicle which differs from the environmental sensor. The vehicle's other sensor is designed, for example, as a camera and/or as a lidar sensor and/or as a radar sensor and/or as an ultrasonic sensor and/or as a sensor other than these. The additional sensor is particularly advantageously arranged in the vicinity of the environmental sensor (e.g. at a distance of up to 2 m, preferably up to 1 m and particularly preferably up to 0.5 m) and further preferably has a similar orientation to the environmental sensor with regard to a main detection direction, so that the influence of potentially soiling-causing objects in the vehicle's environment on the environmental sensor can be estimated with sufficient accuracy by detecting the objects by means of the additional sensor. However, such a similar arrangement and/or orientation of the further sensor is not a mandatory requirement for the present invention.

In a further advantageous configuration of the present invention, the evaluation unit is set up to determine the information about the objects in the environment of the vehicle on the basis of a wireless communication link, via which the evaluation unit is set up to receive the information about the objects from a wireless communication participant arranged away from the vehicle. The wireless communication connection is, for example, a mobile phone connection and/or a WLAN connection and/or a Bluetooth connection and/or a different wireless communication connection. The evaluation unit is advantageously connected in terms of information technology to a wireless communication unit of the vehicle for this purpose.

The wireless communication participant away from the vehicle with which the wireless communication link is established to receive the information about the objects is, for example, another road user (e.g. by means of so-called "car2car" communication) and/or a traffic information system and/or a traffic guidance system (in particular a stationary system which can be provided, for example, on gantries and/or traffic lights etc. to monitor and/or regulate road traffic) and/or a weather service and/or a cloud service. Accordingly, it is also conceivable that information about soiling-causing objects is centrally compiled and provided by some or all of the aforementioned and possibly by other wireless communication participants (e.g., via the cloud service).

The evaluation unit is particularly advantageously set up to determine the respective minimum distances to the objects depending on an arrangement position and/or a type and/or an orientation of the environmental sensor on the vehicle and/or a characteristic of the objects (e.g. a type of object, a vehicle type, a shape, a size, etc.) and/or from vehicle parameters and/or operating parameters of the vehicle (e.g. a type of drive, a maneuverability, a performance, an equipment of the vehicle, etc.) and/or a prediction of a relative movement and/or a relative speed of the objects in relation to the vehicle and/or a position and/or a direction of travel of the vehicle and/or the objects and/or a type of road (e.g. highway, country road, etc.) and/or a characteristic of a road (e.g. road width, number of lanes, etc., which limit potential evasion options) and/or a condition of a roadway (e.g. a state of damage which can cause puddles to form, etc.) and/or a planned driving maneuver of the vehicle (e.g. an overtaking maneuver, vehicle guidance in autonomous driving mode, etc.) and/or a traffic volume (e.g. an obstruction can occur).) and/or a planned driving maneuver of the vehicle (e.g. an overtaking maneuver, vehicle guidance in an autonomous driving mode, etc.) and/or a traffic volume (e.g. pollution minimization can only be possible to a reduced extent in the event of a high traffic volume) and/or active route guidance of the vehicle (e.g. to determine whether the active route guidance is being used), to determine whether the active route guidance is suitable for minimizing pollution of the environmental sensor or whether an alternative route should be determined automatically) and/or route parameters (e.g. altitude, gradients, number of bends, radii of curvature of bends, etc.), which are provided, for example, by a navigation system of the vehicle and/or recorded by a sensor of the vehicle) and/or weather information (e.g. information on the amount of precipitation present, from which a probability of splashing water and puddle formation, etc. can be derived). Taking into account the above-mentioned and possibly further boundary conditions, which can have an influence on the soiling of the environmental sensor, a particularly targeted and particularly reliable minimization of the soiling of the environmental sensor can be achieved accordingly.

Further advantageously, the device according to the invention additionally has a control unit which is set up to receive the signal from the evaluation unit and to set respective minimum distances to the objects on the basis of the signal. The control unit and the evaluation unit are designed, for example, as separate components or as integrated components, wherein the integrated design can be an arrangement of the control unit and the evaluation unit in the same control device and/or a design in which the control device and the evaluation unit are the same component (e.g., a microcontroller or an ASIC). The minimum distances are preferably set by the control unit by automatically adjusting a trajectory and/or a driving maneuver, in particular an evasive maneuver and/or a route and/or a speed and/or an acceleration of the vehicle. In order to set the minimum distances, the control unit is, for example, connected in terms of information technology to a drive unit of the vehicle, in particular to an engine control unit and/or to a steering device of the vehicle and/or to a driver assistance system and/or to a system for (partially) autonomous driving, etc., in order to issue respective control commands to these components for setting the minimum distances. Alternatively or additionally, the control unit is set up to suggest a start and/or an interruption of the journey for the vehicle, for example by informing a driver of the vehicle via an optical and/or acoustic interface of the vehicle and/or via a user terminal device (e.g. a cell phone, a tablet computer, a smart watch, etc.) connected to the vehicle in terms of information technology. By changing the start of the journey and/or interrupting the journey, it is possible, for example, to avoid current congestion situations and/or situations with high traffic volumes and/or high precipitation, which means that the soiling of the environmental sensor can be minimized to a correspondingly greater extent.

In a further advantageous configuration of the present invention, the evaluation unit is set up to determine a degree and/or a type of soiling of the environmental sensor and to additionally determine the respective minimum distances to the objects depending on the degree and/or the type of soiling of the environmental sensor. For example, solid, loose, liquid, pasty, strongly or less strongly adhering, water-soluble, water-insoluble soiling can be distinguished in order to be able to determine the minimum distances even more precisely. The higher the current degree of soiling of the environmental sensor, the higher the minimum distances are determined.

Preferably, the device according to the invention also has a cleaning unit which is set up to clean the environmental sensor at least in a region which is set up to influence a field of view of the environmental sensor. This is, for example, a region of an environmental interface of the sensor, such as a window, through which the respective measurement signals can exit and/or emerge from the environmental sensor. The cleaning unit comprises, for example, a nozzle which is arranged at such a distance and in such an orientation with respect to the environmental sensor that, in conjunction with a pressure generator (e.g., a pump), it is set up to eject air and/or a liquid for cleaning the environmental sensor onto the region of the environmental sensor to be cleaned. Alternatively or additionally, the cleaning unit comprises, for example, a wiping element which is set up to be guided over the region to be cleaned by means of a drive while in contact with the region to be cleaned. The evaluation unit is also set up to initiate cleaning of the environmental sensor by controlling the cleaning unit if the degree of soiling of the environmental sensor exceeds a predefined threshold value and/or if a type of soiling corresponds to one or more predefined categories. The cleaning unit can be used to particular advantage if the minimization of soiling of the environmental sensor on the basis of a minimum distance-based soiling avoidance strategy is not sufficient due to existing boundary conditions (e.g., due to a high traffic volume and/or a lack of alternative routes and/or due to a precipitation situation, etc.) in order to maintain the functionality of the environmental sensor.

The evaluation unit is also advantageously set up to determine the minimum distances, taking into account the cleaning capacity of the cleaning unit. In particular, an existing residual quantity of a wiping water to be dispensed by the cleaning unit and/or a cleaning performance of the cleaning unit etc. can be taken into account.

In a further advantageous configuration of the present invention, the evaluation unit is set up to determine suitable minimum distances on the basis of a comparison of a current driving situation with driving situations which are stored in a predefined data set in conjunction with corresponding minimum distances. The data record is stored, for example, in a memory unit connected to the evaluation unit in terms of information technology. For example, the evaluation unit is set up to determine the driving situation in the data set that is most similar to the current driving situation. For example, certain parameters that adequately describe the respective driving situation are defined and determined for this purpose. This makes it possible to determine the driving situation with the greatest degree of similarity in the data set, for example by applying similarity measures known from the prior art. The minimum distances stored for the most similar driving situation determined in the data set and corresponding to the driving situation can then be read out and used by the evaluation unit. It is particularly advantageous that the evaluation unit is set up to update and/or expand the data set on the basis of a machine learning method and/or on the basis of data provided off the vehicle in order to improve the minimization of soiling through more accurate and/or more up-to-date data over time.

Alternatively or additionally, the evaluation unit is set up to determine information about soiling-causing objects in the environment of the vehicle and/or suitable minimum distances and/or to generate and provide the signal representing the minimum distances only if predefined environmental criteria are met (e.g. precipitation present, high traffic volume present, puddles present, use of the vehicle outside of parking lots and/or outside of urban traffic, etc.) and/or if driving safety is not impaired and/or driving comfort is restricted only within a predefined range.

BRIEF DESCRIPTION OF THE DRAWINGS

In the following, embodiment examples of the invention are described in detail with reference to the accompanying drawing. The figures show.

DETAILED DESCRIPTION

Figure 1:
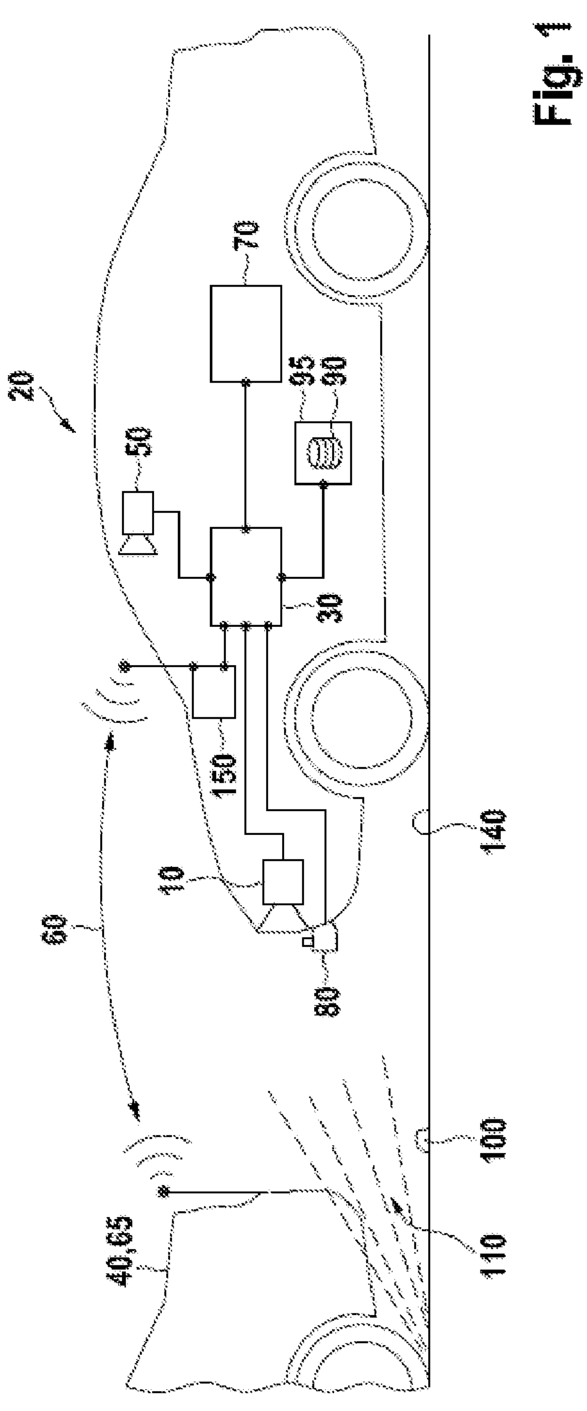
FIG. 1 a schematic view of an embodiment of a device according to the invention for minimizing soiling of an environmental sensor of a vehicle in connection with such a vehicle.

FIG. 1 shows a schematic view of an embodiment of a device according to the invention for minimizing soiling of an environmental sensor 10 of a vehicle 20 in conjunction with such a vehicle 20, wherein the environmental sensor 10 is designed here as a lidar sensor and the vehicle 20 is designed here as a passenger car.

The device for minimizing soiling of the environmental sensor 10 of the vehicle 20 has an evaluation unit 30 designed as an ASIC, which is connected in terms of information technology to a further sensor 50, which is designed here as a camera, a control unit 70, a cleaning unit 80, a memory unit 90 comprising a data set 90 and a wireless communication unit 150.

Based on the configuration described above, the evaluation unit 30 is set up to determine information about objects 40 (here another vehicle) in the environment of the vehicle 20, which are potentially set up to cause soiling of the environmental sensor 10 in a region of a field of view of the environmental sensor 10. The objects 40 are determined here by evaluating measurement signals from the environmental sensor 10 itself and additionally by evaluating measurement signals from the other sensor 50, which ensures a particularly high level of reliability in the detection and recognition of objects 40 in the environment of the vehicle 20.

Furthermore, the evaluation unit 30 is set up to establish a wireless communication connection 60 to the object 40, which is designed as a vehicle and functions here as a wireless communication participant 65, via the wireless communication unit 150. Via the wireless communication link 60, the evaluation unit 30 is set up to receive information about the object 40 and/or information about other objects 40 in the environment of the vehicle 20 from the wireless communication participant 65 and to use this information when determining potentially soiling-causing objects 40.

The evaluation unit 30 is further set up to determine minimum distances to the respective objects 40 on the basis of the information determined about the objects 40, compliance with which is suitable for minimizing soiling of the environmental sensor 10. When determining the minimum distances, particular consideration is given to the presence of wetness 100 on a roadway 140 traveled by the vehicle 20, which, in conjunction with moving objects 40 in the environment of the vehicle 20, can lead to the generation of splash water 110, which can cause soiling of the environmental sensor 10 and impair its detection performance.

The evaluation unit 30 is also set up to compare the current driving situation with a large number of driving situations that are stored in the data set 90 in the memory unit 95. During matching, the driving situation in the data set 90 is determined which, using a degree of similarity, has the greatest correspondence with the current driving situation. For the driving situation identified in the data set 90, minimum distances corresponding to the driving situation are stored, which are also taken into account by the evaluation unit 30 when determining the currently suitable minimum distances.

The evaluation unit 30 is additionally set up to generate a signal representing the determined minimum distances and to provide this signal to the control unit 70, which in turn is set up to adjust the minimum distances on the basis of the signal by automatically adjusting a speed of the vehicle 20 and/or a trajectory of the vehicle 20.

Finally, the evaluation unit 30 is set up to determine a degree of soiling of the environmental sensor 10 and to trigger the cleaning unit 80 to activate cleaning of the environmental sensor 10 as soon as a predefined threshold value is exceeded by the degree of soiling determined.

Figure 2:
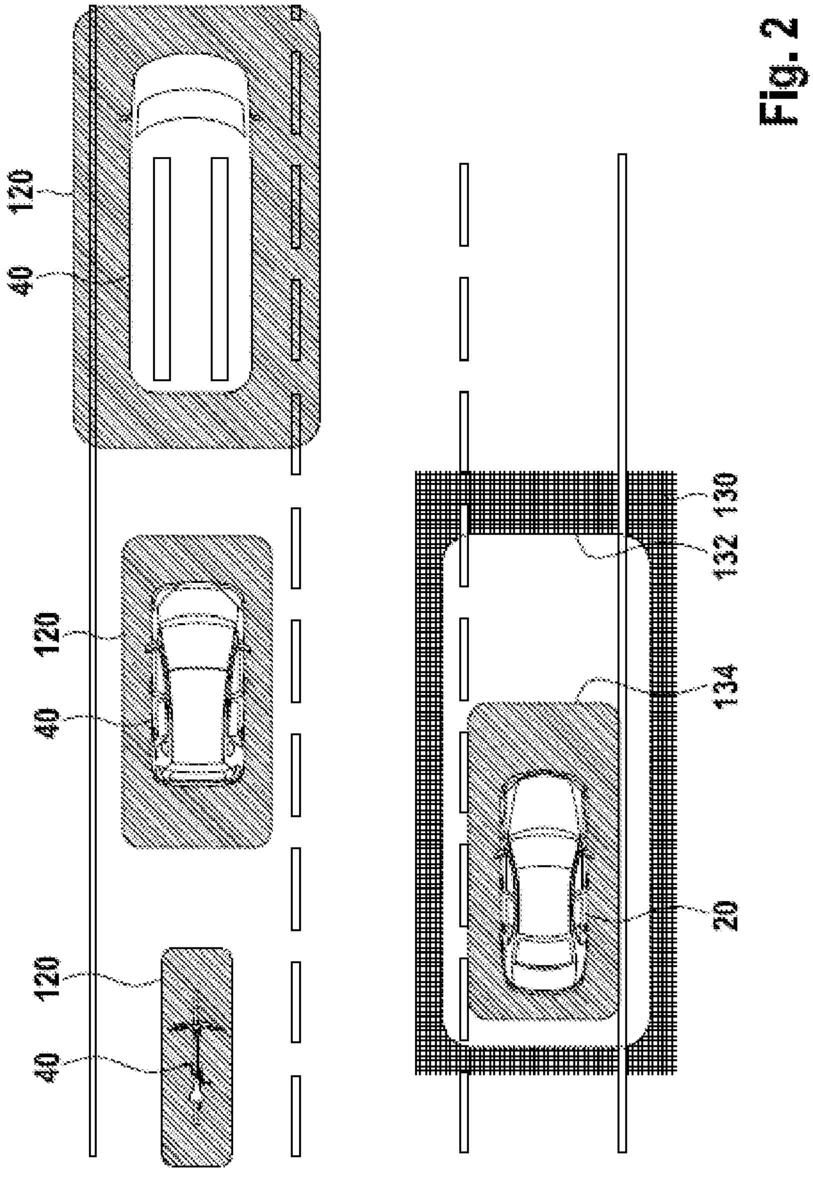
FIG. 2 a schematic view of an exemplary traffic situation in the environment of a vehicle with a device according to the invention.

FIG. 2 shows a schematic view of an exemplary traffic situation in the environment of a vehicle 20 with a device according to the invention (not shown).

In this case, an evaluation unit 30 of the device according to the invention, designed as described in FIG. 1, is set up to additionally determine soiling zones 120 corresponding in each case to the type and size of the objects 40, which are determined by means of the evaluation unit 30 in the environment of the vehicle 20.

The respective soiling zones 120 represent regions around the objects 40 within which soiling can be caused by the objects 40, which can have an effect on the environmental sensor 10 of the vehicle 20 described in FIG. 1.

Avoidance of the respective soiling zones 120 by the vehicle 20 accordingly prevents soiling of the environmental sensor 10.

A first vehicle zone 130, a second vehicle zone 132 and a third vehicle zone 134 are also defined around the vehicle 10, which are taken into account by the evaluation unit 30 in conjunction with the respective soiling zones 120 when determining suitable distances to the objects 40 in accordance with the invention.

If it is possible for the evaluation unit 30 to determine minimum distances between the vehicle 20 and the objects 40, taking into account the current boundary conditions, on the basis of which overlapping of the respective soiling zones 120 and the first vehicle zone 130 can be avoided, soiling of the environmental sensor 10 can be reliably avoided.

In a case in which only the overlapping of the second vehicle zone 132 and the third vehicle zone 134 with the respective soiling zones 120 can be avoided by the determined minimum distances, it can be assumed that soiling of the environmental sensor 10 is of correspondingly lesser degree.

In a case in which only the overlapping of the third vehicle zone 134 with the respective soiling zones 120 can be avoided by the determined minimum distances, it can be assumed that the soiling of the environmental sensor 10 is of a medium degree.

In a case in which the overlapping of the third vehicle zone 134 with the respective soiling zones 120 cannot be avoided by the determined minimum distances, it can be assumed that soiling of the environmental sensor 10 is heavy.

The invention claimed is:

1. A device for minimizing soiling of an environmental sensor (10) of a vehicle (20), comprising
- an evaluation unit (30),
- wherein the evaluation unit (30) is configured to:
- determine information about objects (40) in the environment of the vehicle (20) which are potentially set up to cause soiling of the environmental sensor (10) in a region of a field of view of the environmental sensor (10),
- determine respective soiling zones (120) around the objects (40) corresponding to the type and size of the objects (40) based on the determined information,
- determine a vehicle zone (130, 132, 134) around the vehicle (20)
- determine minimum distances to the respective objects (40) based on the respective soiling zones (120) and the vehicle zone (130, 132, 134) such that an overlap between the respective soiling zones (120) and the vehicle zone (130, 132, 134) is avoided, and
- generate a signal representing the determined minimum distances, and
- control the vehicle (20) based on the signal representing the determined minimum distances.

2. The device according to claim 1, wherein the evaluation unit (30) is configured to determine the information about the objects (40) in the environment of the vehicle (20) based on:
- the environmental sensor (10) and/or
- a further sensor (50) of the vehicle which differs from the environmental sensor (10).

3. The device according to claim 1, wherein the evaluation unit (30) is configured to determine the information about the objects (40) in the environment of the vehicle (20) on the basis of a wireless communication link (60), via which the evaluation unit (30) is configured to receive the information about the objects (40) from a wireless communication participant (65) arranged away from the vehicle (20).

4. The device according to claim 3, wherein the wireless communication participant (65) away from the vehicle (20) is:
- another road user, and/or
- a traffic information system, and/or a traffic guidance system, and/or
- a weather service, and/or
- a cloud service.

5. The device according to claim 1, wherein the evaluation unit (30) is configured to determine respective minimum distances to the objects (40) depending on:
- an arrangement position and/or a type and/or an orientation of the environmental sensor (10) on the vehicle (20), and/or
- a characteristic of the objects (40), and/or
- vehicle parameters and/or operating parameters of the vehicle (20), and/or
- a prediction of a relative movement and/or a relative speed of the objects (40) in relation to the vehicle (20), and/or
- a position and/or a direction of travel of the vehicle (20) and/or the objects, and/or
- a road type and/or a condition of a roadway (140), and/or
- a planned driving maneuver of the vehicle (20), and/or
- a traffic volume, and/or
- an active route guidance of the vehicle (20), and/or
- route parameters, and/or
- weather information.

6. The device according to claim 1, further comprising a control unit (70) which is configured to receive the signal from the evaluation unit (30) and to set respective minimum distances to the objects (40) on the basis of the signal, in that:
- a trajectory, and/or
- a driving maneuver, and/or
- a route, and/or
- a speed and/or an acceleration of the vehicle (20) is automatically adapted, and/or
- a start of travel and/or an interruption of travel for the vehicle (20) is suggested.

7. The device according to claim 1, wherein the evaluation unit (30) is configured to:

determine a degree and/or a type of soiling of the environmental sensor (10) based on the overlap between the respective soiling zones (120) and the vehicle zone (130, 132, 134), and additionally determine the respective minimum distances to the objects (40) depending on the degree and/or the type of soiling of the environmental sensor (10).

8. The device according to claim 7, further having a cleaning unit (80), wherein:

the cleaning unit (80) is configured to clean the environmental sensor (10) at least in a region which is set up to influence a field of view of the environmental sensor (10), and the evaluation unit (30) is configured to initiate cleaning of the environmental sensor (10) by controlling the cleaning unit (80) if the degree of soiling of the environmental sensor (10) exceeds a predefined threshold value and/or if a type of soiling corresponds to one or more predefined categories.

9. The device according to claim 8, wherein the evaluation unit (30) is configured to additionally determine the minimum distances taking into account an existing cleaning capacity of the cleaning unit (80).

10. The device according to claim 1, wherein the evaluation unit (30) is configured to:

determine suitable minimum distances in each case on the basis of a comparison of a present driving situation with driving situations which are stored in a predefined data set (90) in conjunction with corresponding minimum distances, and/or update and/or extend the data set (90) on the basis of a machine learning method and/or on the basis of data provided remotely from the vehicle (20).

11. The device according to claim 1, wherein the evaluation unit (30) is configured to determine information about soiling-causing objects (40) in the environment of the vehicle (10) and/or suitable minimum distances and/or to generate and provide the signal representing the minimum distances only if:

predefined environmental criteria are met, and/or driving safety is not impaired, and/or driving comfort is restricted only within a predefined range.

* * * * *